United States Patent
Oh

(10) Patent No.: US 12,325,430 B2
(45) Date of Patent: Jun. 10, 2025

(54) METHOD FOR CONTROLLING DRIVING OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 18/096,832

(22) Filed: Jan. 13, 2023

(65) Prior Publication Data
US 2024/0116519 A1 Apr. 11, 2024

(30) Foreign Application Priority Data

Sep. 28, 2022 (KR) .................. 10-2022-0122951

(51) Int. Cl.
*B60W 40/112* (2012.01)
*B60W 10/16* (2012.01)
*B60W 10/20* (2006.01)
*B60W 30/182* (2020.01)

(52) U.S. Cl.
CPC .......... *B60W 40/112* (2013.01); *B60W 10/16* (2013.01); *B60W 10/20* (2013.01); *B60W 30/182* (2013.01); *B60W 2520/14* (2013.01); *B60W 2720/406* (2013.01)

(58) Field of Classification Search
CPC ............. B60W 40/112; B60W 30/182; B60W 2520/14; B60W 2720/406; B60W 30/045; B60W 10/08; B60W 2510/20; B60W 2520/18; B60W 2710/083; B60L 15/2036; B60L 2240/423; B60Y 2200/91; B60Y 2300/022; B60Y 2300/045; Y02T 10/64
See application file for complete search history.

(56) References Cited

U.S. PATENT DOCUMENTS

| | | | |
|---|---|---|---|
| 2006/0074530 A1* | 4/2006 | Meyers | B60K 23/0808 701/1 |
| 2010/0145574 A1* | 6/2010 | Mattson | B60T 8/17554 701/38 |
| 2013/0073146 A1* | 3/2013 | Konomi | B62D 6/08 701/41 |

(Continued)

FOREIGN PATENT DOCUMENTS

| | | |
|---|---|---|
| JP | 2006-088950 A | 4/2006 |
| JP | 2010-149850 A | 7/2010 |

(Continued)

*Primary Examiner* — Sze-Hon Kong
(74) *Attorney, Agent, or Firm* — Morgan, Lewis & Bockius LLP

(57) ABSTRACT

A method for controlling driving of a vehicle, can control driving of a vehicle so that handling responsiveness may be differentiated in correspondence to a vehicle driving mode, steering input information by a driver, etc. The method for controlling driving of a vehicle distributes a request torque command into a left wheel torque command and a right wheel torque command, corrects the distributed torque commands using a differential control amount according to a vehicle driving mode and steering input information by a driver, and then performs torque command follow control for controlling torque which is applied to the wheels based on the post-correction torque commands.

19 Claims, 6 Drawing Sheets

(56) References Cited

U.S. PATENT DOCUMENTS

| | | | |
|---|---|---|---|
| 2013/0103229 A1* | 4/2013 | Suzuki | B60K 17/344 |
| | | | 701/1 |
| 2016/0297299 A1 | 10/2016 | Richards et al. | |
| 2019/0084570 A1* | 3/2019 | Suzuki | B60W 50/06 |
| 2019/0168745 A1* | 6/2019 | Hashimoto | B60W 10/20 |
| 2019/0375385 A1* | 12/2019 | Reiling | B60T 8/1755 |
| 2020/0114721 A1* | 4/2020 | Tanzan | B60G 17/0157 |
| 2020/0324649 A1* | 10/2020 | Gully | B60W 10/06 |
| 2022/0024306 A1* | 1/2022 | O'Rourke | B60K 17/354 |
| 2022/0111837 A1* | 4/2022 | Yeom | B60W 60/00186 |
| 2023/0147987 A1* | 5/2023 | Suzuki | B62D 5/0481 |
| | | | 701/41 |
| 2023/0286393 A1* | 9/2023 | Takebayashi | B60L 15/2045 |
| 2023/0391206 A1* | 12/2023 | Sallee | B60W 10/08 |
| 2024/0375508 A1* | 11/2024 | Gully | B60T 7/12 |

FOREIGN PATENT DOCUMENTS

| | | |
|---|---|---|
| JP | 2014-043213 A | 3/2014 |
| KR | 2014-0076050 A | 6/2014 |
| KR | 10-2311698 B | 10/2021 |
| KR | 2022-0097595 A | 7/2022 |

* cited by examiner

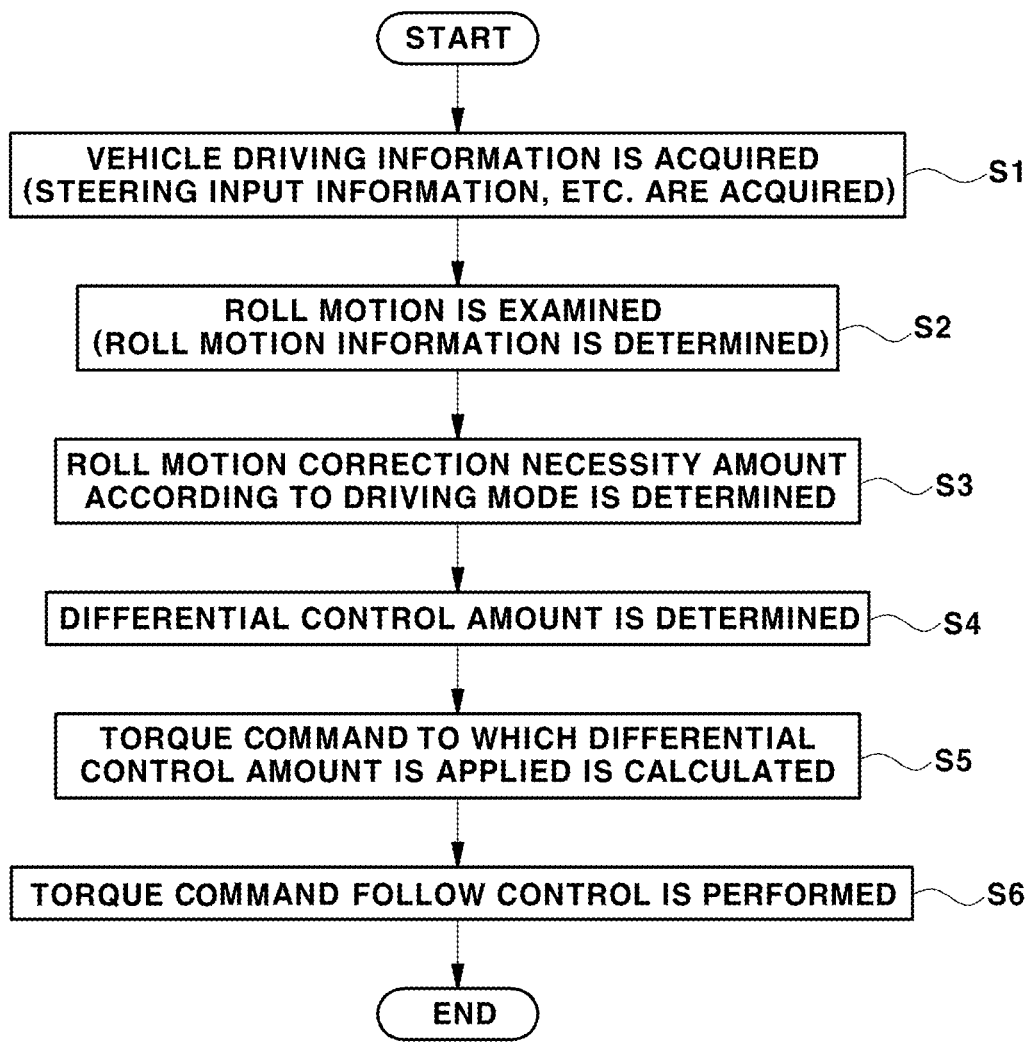

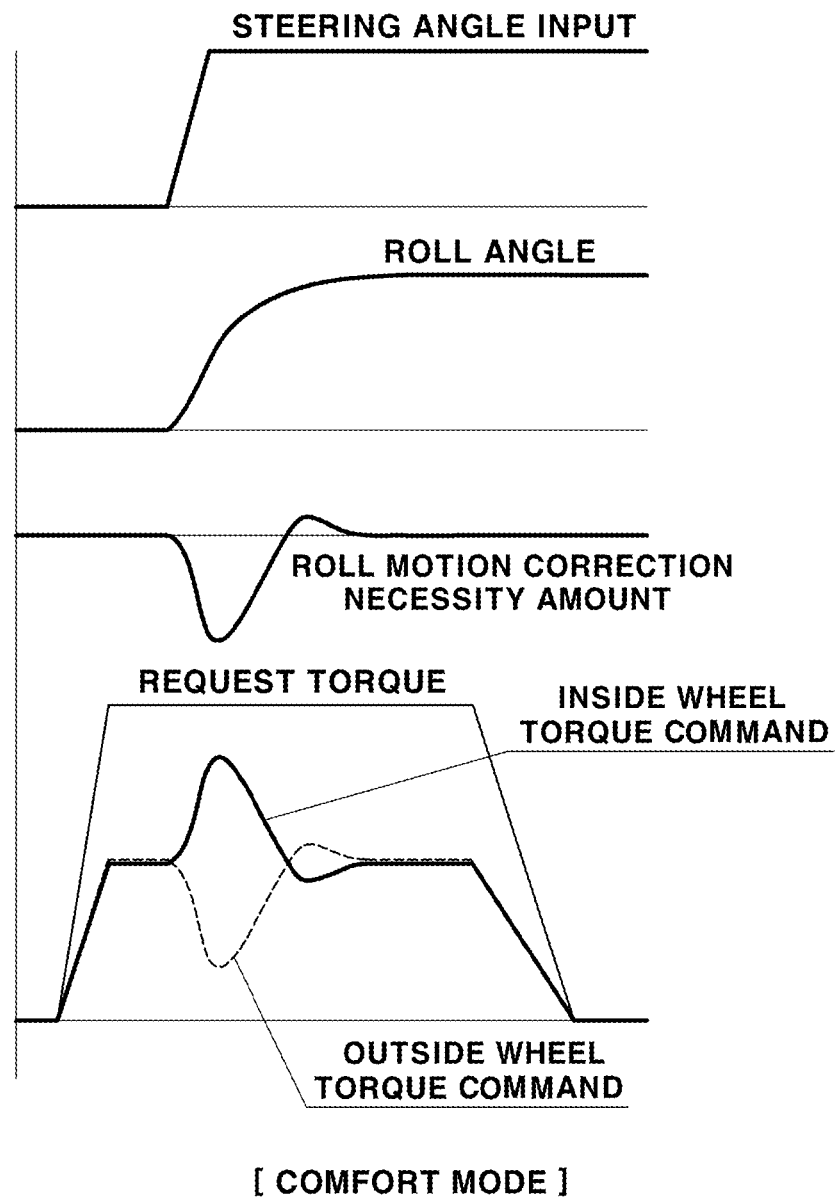

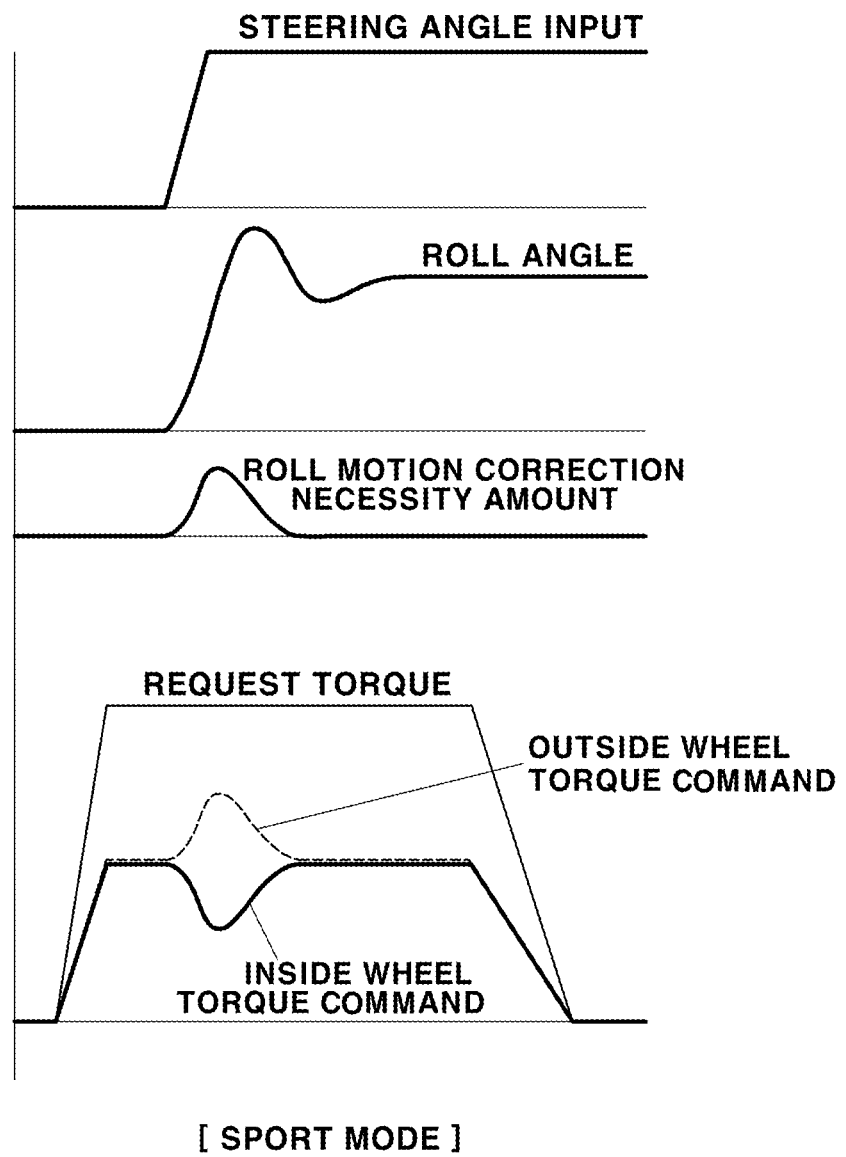

ically, to a method that can control driving of a vehicle so that handling responsiveness may be varied depending on a vehicle driving mode, steering input information by a driver, etc.

METHOD FOR CONTROLLING DRIVING OF VEHICLE

CROSS REFERENCE TO RELATED APPLICATION

The present application claims priority to Korean Patent Application No. 10-2022-0122951, filed Sep. 28, 2022, the entire contents of which is incorporated herein for all purposes by this reference.

BACKGROUND OF THE INVENTION

Field of the Invention

The present disclosure relates to a method for controlling driving of a vehicle, and more particularly, to a method that can control driving of a vehicle so that handling responsiveness may be varied depending on a vehicle driving mode, steering input information by a driver, etc.

Description of the Related Art

As known, handling responsiveness (transverse motion ability) of a vehicle is one of the important factors that determine the propensity and characteristic of the vehicle.

In general, a vehicle having a comfort propensity is set to improve riding comfort by suppressing a roll motion rather than handling responsiveness. However, a vehicle having a sporty propensity is set to maximize handling responsiveness rather than to suppress a roll motion.

In a vehicle provided with an in-wheel motor (an in-wheel motor vehicle), when a function of distributing torque between left and right wheels is used, handling responsiveness may be maximized, or it is possible to actively suppress a roll motion using yaw damping, rolling damping, or the like. This is considered as a specialized advantage of an in-wheel motor vehicle.

In the related art, many technologies of improving handling responsiveness of a vehicle through a strategy that controls an in-wheel motor mounted on each wheel have been provided. However, a method that can implement improvement or characteristics of handling responsiveness of a vehicle as diversified in accordance with driver's requests has not been provided.

There is a demand for a technology that can improve riding comfort through yaw damping or roll damping or enhance a sporty feeling in driving through maximization of handling responsiveness in accordance with driving modes even in the same vehicle.

The information disclosed in this Background of the Invention section is only for enhancement of understanding of the general background of the invention and may not be taken as an acknowledgement or any form of suggestion that this information forms the prior art already known to a person skilled in the art.

SUMMARY OF THE INVENTION

Various aspects of the present disclosure are directed to providing a method that can control driving of a vehicle so that handling responsiveness may be varied depending on a vehicle driving mode, steering input information by a driver, etc.

The objectives of the present disclosure are not limited to those described above and other objectives not stated herein would be apparently understood by those who have ordinary skills in the art that the present disclosure belongs to (hereafter, "those skilled in the art") from the following description.

To achieve the objectives, a method for controlling driving of a vehicle according to an exemplary embodiment of the present disclosure of the present disclosure includes a driving control process based on a roll motion characteristic of the vehicle, wherein the driving control process based on the roll motion characteristic includes: determining, by a controller, a request torque command when the vehicle is in turning and distributing the determined request torque command into a left wheel torque command and a right wheel torque command; determining, by the controller, a roll motion correction necessity amount according to steering input and a current vehicle driving mode when the vehicle is turned; determining, by the controller, a differential control amount for generating a difference in the applied torques between a left wheel and a right wheel of the vehicle based on the determined roll motion correction necessity amount; correcting, by the controller, the distributed left wheel torque command and the distributed right wheel torque command using the determined differential control amount; and controlling, by the controller, torque which is applied to the left wheel and torque which is applied to the right wheel in accordance with the corrected left wheel torque command and the corrected right wheel torque command when the vehicle is turned.

The determining of a roll motion correction necessity amount may include: determining roll motion information of the vehicle according to the steering input when the vehicle is turned; and determining the roll motion correction necessity amount according to the current vehicle driving mode based on the determined roll motion information of the vehicle.

The roll motion information of the vehicle may include at least one of a roll angle, a roll angular speed and a roll angular acceleration that are information obtained by processing the roll angle, and a derivative of the roll angle.

In the determining of the roll motion information of the vehicle, the roll motion information of the vehicle may be measured by a sensor.

In the determining of the roll motion information of the vehicle, the roll motion information of the vehicle may be determined using a transfer function having a steering angle, which is steering input information, as input thereof.

In the determining of the roll motion information of the vehicle, the roll motion information of the vehicle may be finally determined as a sum of roll motion information determined from the steering angle using a steering angle-roll motion transfer function and roll motion information determined from a differential control amount of an immediately previous control period using a differential control amount-roll motion transfer function.

In the determining of the roll motion correction necessity amount, the roll motion correction necessity amount may be determined as a sum of values obtained by multiplying a roll angle and a derivative term of the roll angle, which are the roll motion information, by weights set in accordance with vehicle driving modes, respectively.

In the determining of the roll motion correction necessity amount, the roll motion correction necessity amount may be determined using a transfer function including roll motion information as input thereof, the transfer function may include transfer functions provided for vehicle driving modes, respectively, and the transfer functions provided for the vehicle driving modes, respectively, may have coefficients set as different values in accordance with the vehicle driving modes so that roll motion correction necessity amounts that are differentiated values are determined in accordance with the vehicle driving modes.

In the determining of the roll motion correction necessity amount, the roll motion correction necessity amount may be determined using a transfer function including a steering angle which is steering input information as input thereof, the transfer function may include transfer functions provided for vehicle driving modes, respectively, and the transfer functions provided for the vehicle driving modes, respectively, may have coefficients set as different values in accordance with the vehicle driving modes so that roll motion correction necessity amounts that are differentiated values are determined in accordance with the vehicle driving modes.

In the determining of the roll motion correction necessity amount, the current vehicle driving mode may be one selected from a comfort mode, a normal mode, and a sports mode.

When the current vehicle driving mode is the comfort mode, the roll motion correction necessity amount may be set as a negative (−) value to provide a roll damping effect, and when the current vehicle driving mode is the sports mode, the roll motion correction necessity amount may be set as a value, which is greater than the negative (−) value in the comfort mode, or as a positive (+) value to provide a weak roll damping effect in comparison to the comfort mode or provide a roll moment enhancement effect.

In the determining of the differential control amount, the differential control amount may be determined using a transfer function including the roll motion correction necessity amount as input thereof.

The distributed left wheel torque command and the distributed right wheel torque command may be corrected by ½ of the differential control amount in the correcting of the distributed left wheel torque command and the distributed right wheel torque command so that a difference in the applied torques between the left wheel and the right wheel becomes the differential control amount in the controlling of the torque which is applied to the left wheel and the torque which is applied to the right wheel.

In the left wheel and the right wheel, an inside turning wheel torque command may be corrected by subtracting ½ of the differential control amount and an outside turning wheel torque command may be corrected by adding ½ of the differential control amount.

The method may further include a driving control process based on a yaw motion characteristic for yaw moment enhancement, wherein the driving control process based on the yaw motion characteristic may include: determining the request torque command and distributing the determined request torque command into the left wheel torque command and the right wheel torque command by the controller when the vehicle is turned; determining the differential control amount for generating the difference in the applied torques between the left wheel and the right wheel based on the determined steering input information when the vehicle is turned by the controller; correcting the distributed left wheel torque command and the distributed right wheel torque command using the determined differential control amount by the controller; and controlling the torque which is applied to the left wheel and the torque which is applied to the right wheel in accordance with the corrected left wheel torque command and the corrected right wheel torque command by the controller when the vehicle is turned, and one of the driving control process based on the roll motion characteristic and the driving control process based on the yaw motion characteristic may be selected and performed in accordance with a current vehicle driving mode.

The driving control process based on the roll motion characteristic may be performed when the current vehicle driving mode is a comfort mode, and the driving control process based on the yaw motion characteristic may be performed when the current vehicle driving mode is a sports mode.

In the determining of the differential control amount of the driving control process based on the yaw motion characteristic, the differential control amount may be determined as a function of a steering angle and a derivative of the steering angle that are steering input information.

In the determining of the differential control amount of the driving control process based on the yaw motion characteristic, the differential control amount may be determined using a transfer function including a steering angle, which is steering input information, as input thereof.

In the driving control process based on the yaw motion characteristic, the distributed left wheel torque command and the distributed right wheel torque command may be corrected by ½ of the differential control amount in the correcting of the distributed left wheel torque command and the distributed right wheel torque command so that a difference in the applied torques between the left wheel and the right wheel becomes the differential control amount in the controlling of the torque which is applied to the left wheel and the torque which is applied to the right wheel.

In the driving control process based on the yaw motion characteristic, the differential control amount may be determined as a positive (+) value in the determining of the differential control amount, and In the correcting of the distributed left wheel torque command and the distributed right wheel torque command, correction of subtracting ½ of the determined differential control amount may be performed on an inside turning wheel torque command of the distributed left wheel torque command and the distributed right wheel torque command, and correction of adding ½ of the determined differential control amount may be performed on an outside turning wheel torque command.

Accordingly, in the method for controlling driving of a vehicle according to an exemplary embodiment of the present disclosure, a request torque command is distributed into a left wheel torque command and a right wheel torque command and the distributed left wheel torque command and the distributed right wheel torque command are corrected using a differential control amount determined in accordance with a vehicle driving mode and steering input information by a driver, whereby it is possible to apply torque including a left and right difference corresponding to the differential control amount to a left wheel and a right wheel of a vehicle.

As a result, according to the driving control method of a vehicle of the present disclosure, handling responsiveness (transverse movement performance) of a vehicle may be differentiated in accordance with vehicle driving modes and steering input information by a driver, and particularly, it is possible to provide definitely differentiated handling responsiveness in accordance with driving modes in the same vehicle without adding specific hardware or costs.

The method for controlling driving of the present disclosure not only solves the contradiction relationship existing between riding comfort and handling performance, but differentiates the characteristic of handling performance intended for driving modes, thereby configured to satisfy handling performance at a level that customers want in a wide range and to contribute to improving the commercial value of a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a flowchart showing a driving control process according to an exemplary embodiment of the present disclosure of the present disclosure;

FIG. 4A is a view showing an example in which a torque command for each wheel when a driving mode of a vehicle is a comfort mode by a method for controlling driving according to an exemplary embodiment of the present disclosure of the present disclosure;

FIG. 4C is a view showing an example in which a torque command for each wheel when a driving mode of a vehicle is a sports mode by the method for controlling driving according to an exemplary embodiment of the present disclosure of the present disclosure.

Figure 1:
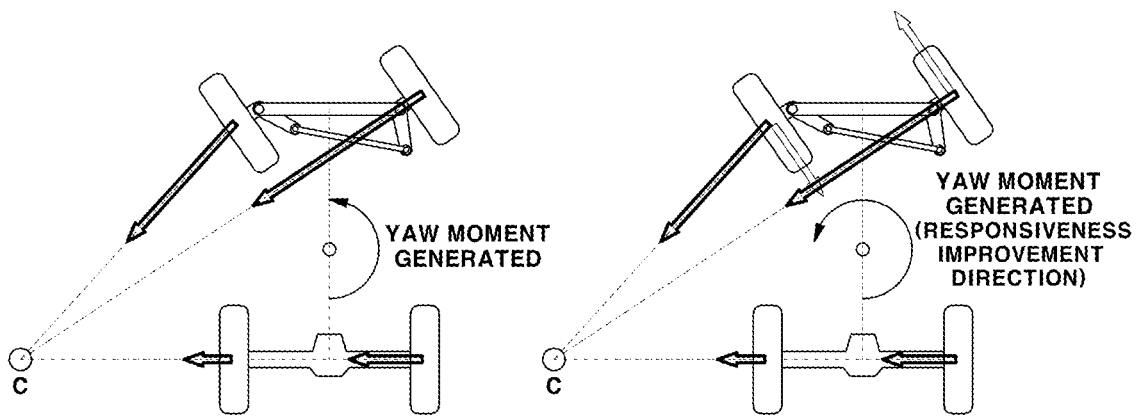
FIG. 1 is a view showing various turning states of a vehicle.

It may be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE INVENTION

Embodiments of the present disclosure will be described hereafter in detail with reference to the accompanying drawings. Description of predetermined structures and functions disclosed in embodiments of the present disclosure are only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "coupled directly to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless stated in the sentences. The terms "comprise" and/or "comprising" used herein do not exclude that another component, step, operation, and/or element exist or are added in the stated component, step, operation, and/or element.

FIG. 1 is a view showing various turning states of a vehicle, in which "C" indicates a turn center portion of the vehicle. Hereafter, the fundamental principle of the present disclosure is described first to help understand the present disclosure. An in-wheel motor vehicle is exemplified in the following description.

In an exemplary embodiment of the present disclosure, handling means driving (steering) of a vehicle by a driver and handling input may be considered as including driving input by a driver. For example, handling input may include steering input by a driver operating a steering wheel, accelerator pedal input by a driving operating an accelerator pedal, brake pedal input by a driving operating a brake pedal, etc.

In an exemplary embodiment of the present disclosure, handling responsiveness means responsiveness of a vehicle according to handling input by a driver, and for example, may be considered as showing a transverse motion ability of a vehicle.

The present disclosure may be applied to a vehicle that can generate a difference of applied torque between left wheels and right wheels, in detail, may be applied to an in-wheel motor vehicle that can individually control torque which is applied to each of left wheels and right wheels using an in-wheel motor mounted on each of the wheels.

Alternatively, the present disclosure may be applied to a vehicle that can individually control torque for a left side and a right side, for example, a vehicle provided with a torque distribution control device such as a torque vectoring device or a differential that can generate a difference of applied torque between left wheels and right wheels.

The fundamental principle of the present disclosure is to differentiate the direction and magnitude of torque, which is each applied to left wheels and right wheels in accordance with handling input by a driver, based on a driving mode of a vehicle and steering input information from a driver when controlling the torque.

The torque is torque which is applied to wheels (driving wheels) by a driving device of a vehicle, and includes both of positive (+) torque in a direction that accelerates a vehicle and negative (−) torque in a direction that decelerates a vehicle.

The driving device may include a left-wheel driving device and a right-wheel driving device. The left-wheel driving device and the right-wheel driving device may be motors that drive a vehicle, and in detail, the motors may be in-wheel motors mounted on wheels, respectively.

That is, a driving device in an in-wheel motor vehicle includes in-wheel motors mounted on wheels and applying torque to the wheels, respectively, an in detail, may include left-wheel in-wheel motors that apply torque to left wheels and right-wheel in-wheel motors that apply torque to right wheels.

The left-wheel in-wheel motors may include an in-wheel motor mounted on the front left wheel and an in-wheel motor mounted on the rear left wheel, and the right-wheel in-wheel motors may include an in-wheel motor mounted on the front right wheel and an in-wheel motor mounted on the rear right wheel.

The positive (+) and the negative (−) in torque show the direction of the torque, the "torque" that will be stated in the following description may be referred to as "driving torque" because it is torque which is applied to wheels and drives the wheels regardless of the positive (+) direction or the negative direction (−).

However, because negative (−) torque which is applied to wheels in deceleration direction of a vehicle is generally braking torque, the positive (+) torque and the negative (−) torque may be separately referred to as "driving torque" and "braking torque", respectively.

As described above, in an exemplary embodiment of the present disclosure, torque has a meaning that includes both driving torque and braking torque, and the force by torque may be force which is the sum of forces acting between the tires of wheels and a road surface.

In the following description, "torque" may be referred to as a "driving force" which is the force by the torque, or the force by positive (+)-directional torque and the force by negative (−)-directional torque may be separately referred to as a "driving force" and a "braking force", respectively.

In an exemplary embodiment of the present disclosure, a left wheel may mean all of the left wheels of a vehicle, and for example, may include a front left wheel and a rear left wheel. In an exemplary embodiment of the present disclosure, a right wheel may mean all of the right wheels of a vehicle, and for example, may include a front right wheel and a rear right wheel.

Accordingly, left wheel torque is torque which is the sum of all the torque which is applied to all of the left wheels of a vehicle, that is, the front and rear left wheels, and right wheel torque is the sum of all the torque which is applied to all of the right wheels of a vehicle, that is, the front and rear right wheels.

For example, left wheel torque may be torque which is the sum of the torque applied to a front left wheel and the torque applied to a rear left wheel, and right wheel torque may be torque which is the sum of the torque applied to a front right wheel and the torque applied to a rear right wheel.

This way is applied also to a left wheel torque command and a right wheel torque command. A left wheel torque command has a value which is the sum of command values for the driving device of the front left wheel (the in-wheel motor of the front left wheel) and the driving device of the rear left wheel (the in-wheel motor of the rear left wheel), respectively.

A right wheel torque command may have a value which is the sum of command values for the driving device of the front right wheel (the in-wheel motor of the front right wheel) and the driving device of the rear right wheel (the in-wheel motor of the rear right wheel), respectively.

Because an in-wheel motor vehicle is a vehicle that can individually control torque which is applied to left wheels and right wheels, the vehicle not only can turn by adjusting the Ackermann angles of wheels, but can turn using the difference in torque between left wheels and right wheels.

It means that it is possible to induce or suppress turning of a vehicle regardless of steering input by a driver operating a steering wheel. Accordingly, it is possible to differentiate a turning characteristic or transverse responsiveness in driving modes of a vehicle by appropriately inducing differences in direction and magnitude of torque, which is applied to left wheels and right wheels, in accordance with the driving modes of the vehicle.

Most vehicles generate a roll angle when turning due to the characteristics of the suspension and the kinetic structure, and a driver and passengers are influenced by a roll characteristic in a considerably great portion of the factors that make them actually feel a turning characteristic.

Accordingly, it is possible to induce a driver and passengers to feel differentiated turning characteristics in accordance with modes by changing a roll motion characteristic by appropriately controlling yaw damping or roll damping.

In an exemplary embodiment of the present disclosure, the roll motion characteristic means the characteristic of a motion in which load is moved by a transverse motion of a vehicle and a suspension is transversely inclined. A roll motion that a driver and passengers experience is not only simply influenced by only a roll angle (that is, a lateral inclination angle), but complexly influenced by a roll angular speed, a roll angular acceleration, etc. Accordingly, the roll motion characteristic is used as a term that generally means variables related to roll dynamics in an exemplary embodiment of the present disclosure.

Figure 2:
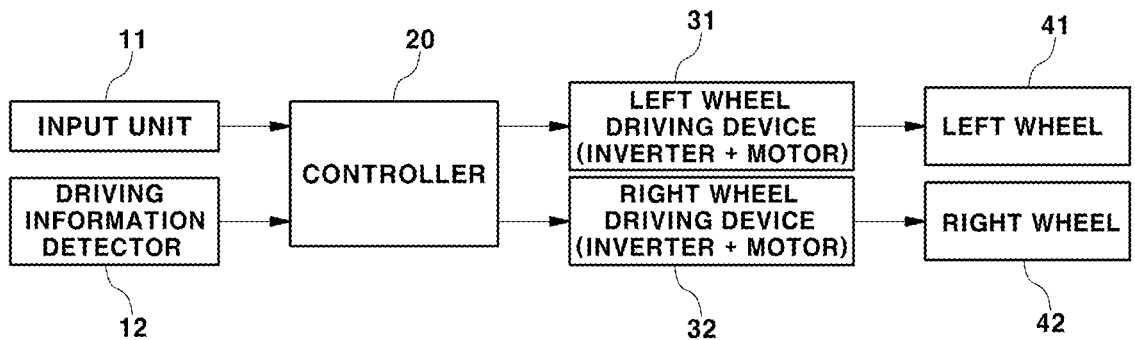
FIG. 2 is a block diagram showing the configuration of a device that performs a driving control process according to an exemplary embodiment of the present disclosure of the present disclosure.

Hereafter, a control method according to an exemplary embodiment of the present disclosure of the present disclosure is described in detail. FIG. 2 is a block diagram showing the configuration of a device that performs a driving control process according to an exemplary embodiment of the present disclosure of the present disclosure and FIG. 3 is a flowchart showing a control process according to an exemplary embodiment of the present disclosure of the present disclosure.

As shown in the figures, a driving control device includes a controller 20 that determines a torque command from vehicle driving information and is configured to control torque which is applied to driving wheels 41 and 42 using the determined torque command, and driving devices 31 and 32 that apply controlled torque to the driving wheels 41 and 42 by operating in accordance with a torque command output from the controller 20 to drive a vehicle.

As known in the art, an electrified vehicle includes motors as the driving devices 31 and 32 and further includes, in addition to the motors, inverters that drive and control the motors in accordance with a torque command which is output from the controller 20. With the motors and the inverter mounted, as described above, a battery of the vehicle is connected to the motors through the inverters to be chargeable and dischargeable In an exemplary embodiment of the present disclosure, the driving devices of a vehicle include a left wheel driving device 31 that applies torque to a left wheel 41 and a right wheel driving device 32 that applies torque to a right wheel 42, and each of the driving devices may include a motor and an inverter.

In an exemplary embodiment of the present disclosure, the left wheel driving device 31 may include left wheel in-wheel motors and inverters, and the left wheel in-wheel motors may include an in-wheel motor mounted on a front left wheel and an in-wheel motor mounted on a rear left wheel.

In an exemplary embodiment of the present disclosure, the right wheel driving device 32 may include right wheel in-wheel motors and inverters, and the right wheel in-wheel motors may include an in-wheel motor mounted on a front right wheel and an in-wheel motor mounted on a rear right wheel.

In an exemplary embodiment of the present disclosure, the controller 20 determines a request torque based on vehicle driving information which is collected in real time while the vehicle is driven, distributes a torque command (request torque command) for generating the determined request torque into a left wheel torque command and right wheel torque command, and is configured to control operation of the left wheel driving device 31 and the right wheel driving device 32 in accordance with the distributed torque commands, respectively.

The controller 20 may include a plurality of controllers that performs common cooperative control to drive a vehicle. For example, the controller 20 may include a common vehicle control unit (VCU) that determines a request torque command based on vehicle driving information obtained in real time from the vehicle, and a motor control unit (MCU) that is configured to control operation of the left wheel in-wheel motors and the right wheel in-wheel motors in accordance with torque commands that are output from the VCU for the driving devices, respectively.

In an exemplary embodiment of the present disclosure, a method of determining a request torque command from real-time vehicle driving information is not different from well-known methods of determining a request torque command based on vehicle driving information in common vehicles.

The driving control device that performs a control process according to an exemplary embodiment of the present disclosure of the present disclosure may further include an input unit 11 that inputs vehicle driving modes selected by a driver to the controller 20, and a driving information detector 12 that is configured to detect vehicle driving information.

The input unit 11 may be a common device that a driver can operate to select driving modes in a vehicle, and for example, at least one of a button, a switch, a lever, a dial, a touch screen, etc. may be applied as long as they can input an electrical signal according to operation by a driver to the controller 20.

Driving modes of a vehicle which may be selected through the input unit 11 may include a comfort mode, a normal mode, and a sports mode. Because the driving modes are well-known driving modes that are recently widely applied to vehicles, the propensities or characteristics of the driving mode are not described in detail herein.

A request torque command which is determined by the controller 20 is determined and generated based on vehicle driving information collected in real time while the vehicle is driven, and the vehicle driving information may be information which is detected by the driving information detector 12 and then input to the controller through a network of the vehicle.

The driving information detector 12 that is configured to detect vehicle driving information may include an accelerator position sensor (APS) that is configured to detect an accelerator pedal input value by a driver, a brake pedal sensor (BPS) that is configured to detect a brake pedal input value by a driver, a sensor which is configured to detect a drivetrain speed, and a sensor which is configured to detect a vehicle speed.

The driving information detector 12 may further include a steering angle sensor (SAS) that is configured to detect a steering angle by a driver operating a steering wheel as steering input information, and a sensor which is configured to detect acceleration of a vehicle.

The drivetrain speed may include rotation speeds of the driving devices 31 and 32 (driving device speeds), and rotation speeds of driving wheels 41 and 42 connected to the driving devices to be able to transmit power (wheel speed, driving wheel speeds). The rotation speed of a driving device may be the rotation speed of a motor (a motor speed).

The sensor which is configured to detect the drivetrain speed includes a motor speed sensor which is configured to detect a motor speed, and the motor speed sensor may be a resolver that is configured to detect the position of the rotor of a motor. When the driving devices 31 and 32 are in-wheel motors mounted on the wheels 41 and 42, respectively, in an exemplary embodiment of the present disclosure, the motor speed sensor may be a sensor which is configured to detect the speed of each of the in-wheel motors, and the sensor may be a resolver provided on each of the in-wheel motors.

The sensor which is configured to detect a drivetrain speed may be a wheel speed sensor which is configured to detect the rotation speed (wheel speed) of the driving wheels 41 and 42. The sensor which is configured to detect a vehicle speed may also be a wheel speed sensor. It is well known in the field of the art that vehicle speed information is obtained from a signal of a wheel speed sensor, so it is not described in detail. The sensor which is configured to detect acceleration (longitudinal acceleration, transverse acceleration) of a vehicle may be a common acceleration sensor.

Accordingly, an accelerator pedal input value (APS value) and a brake pedal input value (BPS value) by a driver, a driving device speed (motor speed), a driving wheel speed (wheel speed), a vehicle speed, a steering angle which is steering input information by a driver, acceleration of a vehicle, etc. may be used as the vehicle deriving information which is detected by the driving information detector 12 in an exemplary embodiment of the present disclosure.

The request torque in an exemplary embodiment of the present disclosure, as described above, may be determined by the controller 20 itself based on real-time vehicle driving information which is detected by the driving information detector 12, or may be input to the controller 20 through a vehicle network from another controller (e.g., ADAS controller) in the vehicle.

Accordingly, the controller 20 can determine and generate a torque command for each driving wheel in accordance with request torque which is determined based on vehicle driving information which is detected by the driving information detector 12, or request torque which is input from another controller.

The controller 20 can distribute a request torque command into a left wheel torque command and a right wheel torque command, and can correct the distributed left wheel torque command and a right wheel torque command into torque commands, which generate a left and right torque difference, using a driving mode of a vehicle and steering input information by a driver. The steering input information may be steering angle information and the steering angle information may be a steering angle which is detected by a steering angle sensor.

As a result, the controller 20 can control operation of the left wheel driving device 31 and the right wheel driving device 32 that apply torque to the left wheel 41 and the right wheel 42 in accordance with the corrected left wheel torque command and right wheel torque command, respectively. That is, it is possible to correct a left wheel in-wheel motor and a right wheel in-wheel motor, which are driving devices, and then control the in-wheel motors in accordance with torque commands.

Alternatively, the controller 20 may control operation of a torque distribution controller, which can generate a difference in applied torque between left and right wheels, rather than the left wheel driving device 31 and the right wheel driving device 32 so that left and right wheel torque distribution amounts may be controlled in accordance with the corrected left wheel torque command and right wheel torque command.

Meanwhile, as described above, the controller 20 can determine a left wheel torque command and a right wheel torque command, which generate a difference in applied torque (hereafter, referred to as a "left and right torque difference") between a left wheel and a right wheel (an inside turning wheel and an outside turning wheel), from a request torque command in accordance with a driving mode and steering input information when a vehicle is turned.

Final left wheel torque command and right wheel torque command for selectively generating a left and right torque difference may be determined as a value obtained by correcting a request torque command, which is determined based on real-time vehicle driving information, by applying a differential control amount to a left wheel torque command and a right wheel torque command that are distributed in accordance with an existing distribution ratio (e.g., a distribution ratio of 1:1).

The differential control amount is used to correct a left wheel torque command and a right wheel torque command. A differential control amount which is used to correct torque commands in an exemplary embodiment of the present disclosure of the present disclosure may be determined based on a driving mode of a vehicle and steering input information by a driver.

In an exemplary embodiment of the present disclosure, a differential control amount which is determined as described above is for generating a left and right torque difference when a vehicle is turned, and may be determined as a torque value corresponding to a left and right torque difference which is required for turning.

In an exemplary embodiment of the present disclosure of the present disclosure, the controller 20 obtains vehicle driving information through the driving information detector 12 (step S1 in FIG. 3). The controller 20 determines a request torque command from the obtained vehicle driving information and determines whether a vehicle is being turned by detecting steering input.

When determining that a vehicle is being turned by detecting steering input, the controller 20 can determine a differential control amount as a value according to a vehicle driving mode selected by a driver (step S4 in FIG. 3).

The differential control amount which is determined in accordance with a vehicle driving mode by the controller 20 may be used to correct left and right wheel torque commands distributed from a request torque command.

That is, when a vehicle is turned, the controller 20 corrects a pre-correction left wheel torque command and a pre-correction right wheel torque command that are distributed from a request torque command using a differential control amount, thereby determining final left wheel torque command and right wheel torque command (step S5 in FIG. 3).

The controller 20 is configured to control operation of the left wheel driving device 31 and the right wheel driving device 32 in accordance with the determined final torque commands so that the torque of the final commands may be applied to a left wheel and a right wheel by the driving devices, respectively (step S6 in FIG. 3).

For reference, when a vehicle is turned, one of the left wheel 41 and the right wheel 42 of the vehicle is an inside turning wheel and the other one is an outside turning wheel, and it has been well known in the art that the wheel close from a turn center portion (reference character 'C' in FIG. 1) of a left wheel and a right wheel is an inside wheel and the wheel far from the turn center portion is an outside wheel.

As described above, because one of the left wheel 41 and the right wheel 42 becomes an inside wheel and the other one is an outside wheel, depending on the turn direction of a vehicle, one of a left wheel torque command and a right wheel torque command becomes an inside wheel torque command and the other one is an outside wheel torque command.

In an exemplary embodiment of the present disclosure of the present disclosure, the driving mode of a vehicle includes a comfort mode which is a driving mode in which riding comfort takes precedence, a sports mode which is a driving mode in which movement performance takes precedence, and a normal mode that provides riding comfort and movement performance between the comfort mode and the sports mode.

In an exemplary embodiment of the present disclosure of the present disclosure, when the current driving mode is the comfort mode, the controller 20 determines a differential control amount so that a roll damping effect is strongly induced, and corrects a pre-correction left wheel torque command and a pre-correction right wheel torque command using the determined differential control amount so that a left and right torque difference corresponding to the differential control amount may be generated between the left wheel 41 and the right wheel 42.

That is, a torque is applied to the left wheel 41 and the right wheel 42 in accordance with final post-correction left wheel torque command and post-correction right wheel torque command so that the left and right torque difference described above is generated between torque which is applied to the left wheel and torque which is applied to the right wheel. In the present case, the differential control amount which is used to correct torque commands may have the same meaning as the left and right torque difference, and the differential control amount and the left and right torque difference may be the same values.

When the current driving mode is the sports mode, the controller 20 determines a differential control amount that induces a roll moment enhancement effect or induces a roll damping effect which is weaker than the roll damping effect in the comfort mode, and corrects the pre-correction left wheel torque command and the pre-correction right wheel torque command based on the determined differential control amount so that a left and right torque difference corresponding to the differential control amount may be generated between the left wheel 41 and the right wheel 42.

When the current driving mode is the normal mode that intends drivability and performance between those of the comfort mode and the sports mode, the controller 20 can determine a differential control amount as a value between the differential control amount in the comport mode and the differential control amount in the sports mode. For example, the differential control amount in the normal mode may be determined as an intermediate value between the differential control amount in the comport mode and the differential control amount in the sports mode.

Accordingly, the left and right torque difference which is generated in the normal mode is positioned between the left and right torque difference which is generated in the comfort mode and the left and right torque difference which is generated in the sports mode.

Alternatively, it is possible to prevent generation of a left and right torque difference in the normal mode, and in the present case, a left wheel torque command and a right wheel torque command distributed from a request torque command in the normal mode are not corrected. For example, final left wheel torque command and right wheel torque command may be determined as the same command values distributed at a ratio of 1:1 from a request torque command.

Furthermore, when a single mode or a plurality of modes that provides drivability and performance that correspond to those in the discriminated modes is further set between the discriminated comfort mode, normal mode, and sports mode, the differential control amount in each of the added driving modes may be determined as an intermediate value therebetween from the values in the discriminated three modes through interpolation.

A roll motion which is described in an exemplary embodiment of the present disclosure is generated by transverse dynamics of a vehicle and a roll motion which is generated in accordance with the inclination or state of a road surface is not considered in an exemplary embodiment of the present disclosure. A roll motion which is described in an exemplary embodiment of the present disclosure is generated by a turn request of a vehicle and the generation pattern of the roll motion may depend on the characteristics or setting values of the suspension and the chassis of the vehicle.

Accordingly, it is required first to examine the dynamic relationship between a roll motion and a steering angle which is steering input information by a driver, and the present dynamic relationship may be defined by a transfer function model between a steering angle and a roll motion.

Alternatively, when there is a specific roll motion measurement method that utilizes sensors, etc. of a vehicle, the dynamic relationship may be replaced with roll motion information measured using the sensors, etc. Roll motion information replaced with a roll motion model examined in advance or a measurement value is used to determine a differential control amount in real time.

In detail, a differential control amount is determined by a dynamic relationship existing between the differential control amount and a roll motion. Accordingly, similar to that it is required to examine the dynamic relationship between a steering angle and a roll motion, it is also required to examine the dynamic relationship between a differential control amount and a roll motion. The present dynamic relationship can also be defined by a transfer function model between the differential control amount and the roll motion.

As described above, in the driving control process according to an exemplary embodiment of the present disclosure, a differential control amount is determined based on roll motion dynamics and a torque command is determined in accordance with the differential control amount, whereby driving of a vehicle is controlled.

The driving control process is described in more detail. First, the controller 20 obtains in real time vehicle driving information which is detected by the driving information detector 12 while the vehicle is driven.

When there is steering input by a driver for turning, the controller 20 obtains steering angle information which is steering input information by a drive which is detected by a steering sensor of the driving information detector 12 and detects steering input from the steering angle information, thereby determining that the vehicle is being turned.

Next, the controller 20 performs a process of examining a roll motion in which real-time roll motion information of the vehicle is obtained from the steering angle using a transfer function between the steering angle and the roll motion information (step S2 in FIG. 3).

Next, the controller 20 determines a roll motion correction necessity amount that means a roll damping or roll moment enhancement necessity amount according to the real-time roll motion information (step S3 in FIG. 3), and in the present case, a roll motion correction necessity amount corresponding to the current vehicle driving mode may be determined from the real-time roll motion information using the transfer function between the roll motion information and the roll motion correction necessity amount.

In the present case, different transfer functions may be used in accordance with driving modes, and accordingly, differentiated roll motion correction necessity amounts may be determined in accordance with driving modes selected by a driver.

In more detail, the roll motion correction necessity amount may be calculated as follows.

When a roll angle which is generated by a turning motion of a vehicle is defined as a roll angle including a positive (+) value and a roll angular speed is defined as a roll angular speed which is inclined in a positive direction and has a positive (+) value, it is possible to determine a roll motion correction necessity amount using the transfer function between real-time roll angle information, which is roll motion information, and a roll motion correction necessity amount or it is possible to determine the sum of values obtained by multiplying the real-time roll angle information and the derivative term of the roll angle information value by weights set in advance in accordance with driving modes as a roll motion correction necessity amount.

It is possible to make the determined roll motion correction necessity amount be a negative (−) value in the comfort mode and be a value greater than the negative (−) value in the comfort mode or be a positive (+) value larger in the sports mode.

Accordingly, the controller 20 determines a differential control amount corresponding to a left and right torque difference from the determined roll motion correction necessity amount, that is, can determine a differential control amount from the roll motion correction necessity amount using the transfer function between the roll motion correction necessity amount and the differential control amount.

When a differential control amount is determined in the present way, the controller 20 determines final left wheel torque command and a right wheel torque command by applying the determined differential control amount, and performs torque command follow control.

The controller 20 is configured to control operation of the driving devices 31 and 32 in accordance with the final left wheel torque command and a right wheel torque command, respectively, so that torque that satisfies request torque is output from the left wheel driving device 31 and the right wheel driving device 32.

The kinds of the transfer functions that are needed in the processes described above are as follows. The transfer function described herein may mean a function that defines the interrelationship between an input variable and an output variable.

An example of the types of the transfer functions is described in the following Equation 1.

$$\frac{y}{x} = \frac{C_{N0} + C_{N1}s + C_{N2}s^2 + C_{N3}s^3 + \ldots}{C_{D0} + C_{D1}s + C_{D2}s^2 + C_{D3}s^3 + \ldots} \quad \text{[Equation 1]}$$

where x is an input variable of the transfer function and y is an output variable of the transfer function. $C_{N0}$, $C_{N1}$, $C_{N2}$, $C_{N3}$, ..., $C_{D0}$, $C_{D1}$, $C_{D2}$, $C_{D3}$, ... are preset coefficients.

Transfer functions ($f_{c1}$ and $f_{c2}$ to be described below) for determining a roll motion correction necessity amount include transfer functions that are provided for vehicle driving modes, respectively, and the transfer functions that are provided for vehicle driving modes, respectively, may have coefficients set as different values, depending on the vehicle driving modes.

Accordingly, a transfer function corresponding to the current vehicle driving mode is selected and used, whereby a roll motion correction necessity amount which is a value differentiated in accordance with the vehicle driving mode may be determined.

The following shows transfer functions that are need to finally calculate a differential control amount from steering input information by a driver.

$f_a$: steering angle→roll motion information, $f_a$ is a transfer function that defines the interrelationship between a steering angle (input) and roll motion information (output)

$f_b$: differential control amount→roll motion information, $f_b$ is a transfer function that defines the interrelationship between a differential control amount (input) and roll motion information (output)

$f_{c1}$: roll motion information→roll motion correction necessity amount, $f_{c1}$ is a transfer function that defines the interrelationship between roll motion information (input) and a roll motion correction necessity amount (output)

$f_{c2}$: steering angle→roll motion correction necessity amount, $f_{c2}$ is a transfer function that defines the interrelationship between a steering angle (input) and a roll motion correction necessity amount (output)

$f_d$: roll motion correction necessity amount→differential control amount, $f_d$ is a transfer function that defines a roll motion correction necessity amount (input) and a differential control amount (output)

In an exemplary embodiment of the present disclosure, the transfer function $f_a$ may be referred to as a "steering angle-roll motion transfer function", and "$f_a$(steering angle)=roll motion information" when the transfer function is expressed into a numerical formula. Furthermore, the transfer function $f_b$ may be referred to as a "differential control amount-roll motion information transfer function", and "$f_b$(differential control amount)=roll motion information" when the transfer function is expressed into a numerical formula.

Similarly, the transfer function $f_{c1}$ may be referred to as a "roll motion information-roll motion correction necessity amount transfer function", and "$f_{c1}$(roll motion information)=roll motion correction necessity amount" when the transfer function is expressed into a numerical formula. Furthermore, the transfer function $f_{c2}$ may be referred to as a "steering angle-roll motion correction necessity amount transfer function", and "$f_{c2}$(steering angle)=roll motion correction necessity amount" when the transfer function is expressed into a numerical formula.

Furthermore, the transfer function $f_d$ may be referred to as a "roll motion correction necessity amount-differential control amount transfer function", and "$f_d$ (roll motion correction necessity amount)=differential control amount" when the transfer function is expressed into a numerical formula.

Comparing with the transfer function $f_b$, the input and the output are opposite in the transfer function $f_d$, so $f_d$ may be replaced with $f_b^{-1}$ which is the inverse function of $f_b$. That is, it is possible to determine a differential control amount from a roll motion correction necessity amount using the inverse function of $f_b$ instead of $f_d$.

To determine a differential control amount from a roll motion correction necessity amount, the inverse function of the differential control amount-roll motion information transfer function may be used, which is "$f_b^{-1}$(roll motion correction necessity amount)=differential control amount" when it is expressed into a numerical formula.

In an exemplary embodiment of the present disclosure, the roll motion information may include at least one of a roll angle, a roll angular speed and a roll angular acceleration that are information obtained by additionally processing the roll angle, and a derivative of the roll angle.

The driving control process according to an exemplary embodiment of the present disclosure is described again as a process that utilizes transfer functions. When a vehicle starts to turn, that is, when steering input by a driver is generated and detected, the controller 20 performs a roll motion examination process, that is, a process of determining roll motion information, and in the present case, can determine in real time roll motion information using the transfer functions $f_a$ and $f_b$. This is expressed as the following equation.

roll motion information=$f_a$(steering angle)+$f_b$(differential control amount)     [Equation 2]

The differential control amount which is the input of the transfer function $f_b$ is a differential control amount determined in the immediately previous control period.

As shown in Equation 2, final roll motion information may be determined as the sum of the roll motion information determined from a steering angle using the steering angle-roll motion transfer function ($f_a$) and the roll motion information determined from a differential control amount using the differential control amount-roll motion transfer function ($f_b$), and the final roll motion information examined in the instant way is used to determine a roll motion correction necessity amount, as in the following Equation 3.

roll motion correction necessity amount=$f_{c1}$(roll motion information)     [Equation 3]

In the present case, using $f_a$, $f_b$, and $f_{c1}$ may be replaced with using $f_{c2}$. That is, it is possible to determine a roll motion correction necessity amount from a steering angle using $f_{c2}$ instead of $f_a$, $f_b$, and $f_{c1}$.

In other words, it is possible to directly determine a roll motion correction necessity amount from a steering angle using $f_{c2}$ which is a steering angle-roll motion correction necessity amount transfer function, as in the following Equation 4, without using Equations 2 and 3.

roll motion correction necessity amount=$f_{c2}$(steering angle) [Equation 4]

When a roll motion correction necessity amount is determined, as described above, the controller 20 can control a differential control amount from the roll motion correction necessity amount using $f_d$ or $f_b^{-1}$. This is expressed as the following Equations 5 and 6.

differential control amount=$f_d$(roll motion correction necessity amount) [Equation 5]

differential control amount=$f_b^{-1}$(roll motion correction necessity amount) [Equation 6]

Furthermore, the calculation process which is performed through several steps above may be performed at a time as in the following Equation 7 by the controller 20 using an integrated transfer function.

differential control amount = [Equation 7]
$f_b^{-1}(f_{c1}(f_a$(steering angle) + $f_b$(differential control amount))) = $f_b^{-1}(f_{c1}(f_a$(steering angle))) + $f_b^{-1}(f_{c1}(f_b$(differential control amount))) = $f_{tot1}$(steering angle) + $f_{tot2}$(differential control amount)

According to Equation 7, using $f_{tot1}$ which is a first integrated transfer function including a steering angle as input thereof and $f_{tot2}$ which is a second integrated transfer function including the differential control amount of the immediately previous control period as input thereof, it is possible to determine a differential control amount of a current control period as the sum of output of the two integrated transfer functions.

$f_{tot1}$ which is the first integrated transfer function is a transfer function that can determine a differential control amount from a steering angle and $f_{tot2}$ which is the second integrated transfer function is a transfer function that can determine a differential control amount from the differential control amount of the immediately pervious control period.

As described above, when a roll motion correction necessity amount is determined in an exemplary embodiment of the present disclosure, the coefficients of the corresponding transfer function are differentiated for vehicle driving modes and are set so that a roll motion correction necessity amount may be determined as a negative (−) value in the comfort mode. In the sports mode, coefficients are set so that a roll motion correction necessity amount may be determined as a value, which is greater than the negative value in the comfort mode, or as a positive (+) value.

Any driving mode generates a differential control amount and a left and right torque difference only when there is steering input by a driver operating a steering wheel and a vehicle is turned rather than always generates them in an exemplary embodiment of the present disclosure. That is, the driving control process of the present disclosure that generates a left and right torque difference regardless of driving modes is not performed when a vehicle is straightly driven.

Figure 4B:
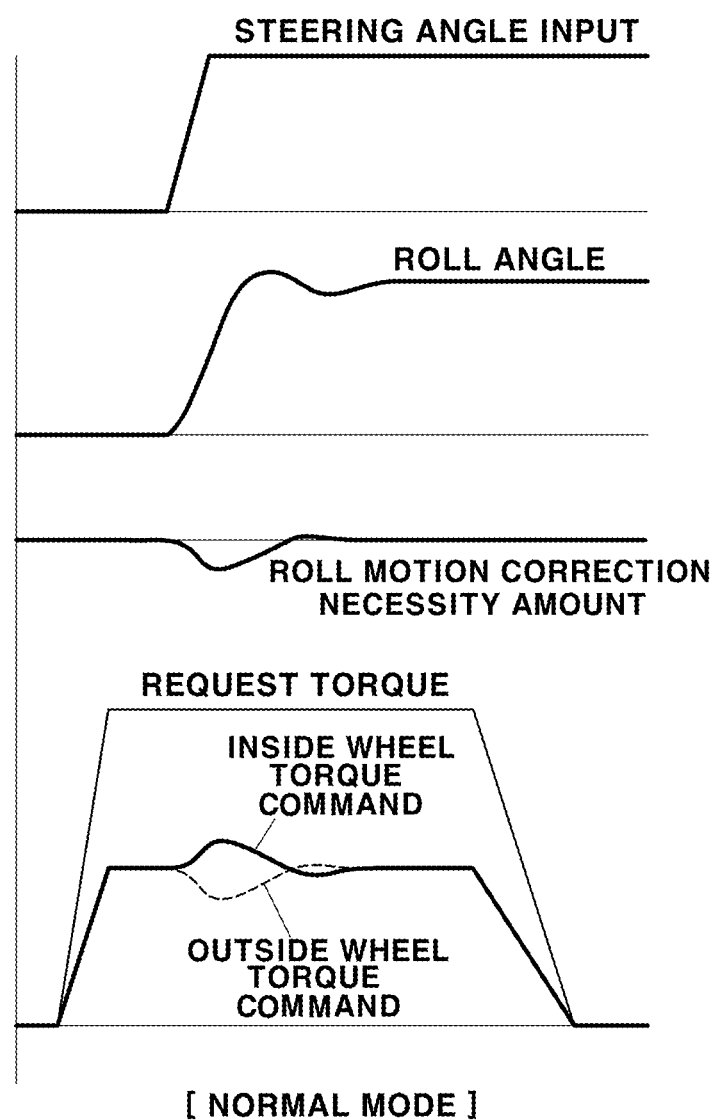
FIG. 4B is a view showing an example in which a torque command for each wheel when a driving mode of a vehicle is a normal mode by the method for controlling driving according to an exemplary embodiment of the present disclosure of the present disclosure.

FIGS. 4A, 4B, and 4C are views showing examples in which a torque command is determined for each wheel in accordance with vehicle driving modes in an exemplary embodiment of the present disclosure. FIG. 4A shows the case in which the driving mode of a vehicle is the comfort mode, FIG. 4B shows the case in which the driving mode of a vehicle is the normal mode, and FIG. 4C shows the case in which the driving mode of a vehicle is the sports mode.

It may be seen from the figures that a roll motion correction necessity amount is determined as a value corresponding to a differential control amount corresponding to a left and right torque difference. The states of a roll angle in driving modes are exemplified in the figures, respectively, and a method of calculating such a roll angle has been well known to those skilled in the art.

In an exemplary embodiment of the present disclosure of the present disclosure, a roll motion correction necessity amount may be determined as a negative (−) value to be able to strongly induce a roll damping effect in the comfort mode, and in the sports mode, a roll motion correction necessity amount may be determined as a value, which is greater than the negative value in the comfort mode, or as a positive (+) value to be able to induce a yaw moment enhancement effect or a roll damping effect weaker than the roll damping effect in the comfort mode. In the normal mode, a roll motion correction necessity amount may be determined as a negative (−) value greater than that in the comfort mode.

As exemplified in FIG. 4A, a differential control amount may be determined as a negative (−) value in the comfort mode and the normal mode. Furthermore, as exemplified in FIG. 4C, a differential control amount may be determined as a positive (+) value in the sports mode.

Because the method for controlling driving of a vehicle according to an exemplary embodiment of the present disclosure is performed when a vehicle is turned, one of the left wheel and the right wheel of the vehicle is an inside turning wheel and the other one is an outside turning wheel, and it is possible to correct an inside wheel torque command by subtracting ½ (a torque correction amount) of a differential control amount and correct an outside wheel torque command by adding ½ (a torque correction amount) of a differential control amount in all of the driving modes.

In an exemplary embodiment of the present disclosure, ½ of a differential control amount which is subtracted or added for an inside wheel torque command and an outside wheel torque command is a torque correction amount, and it is possible to determine final torque commands by correcting an inside wheel torque command and an outside wheel torque command by the torque correction amount corresponding to a differential control amount.

As described above, ½ of a differential control amount, which is obtained as a differentiated value in accordance with driving modes, may be applied to each of a left wheel torque command and a right wheel torque command, and in the present case, the sum of the post-correction left wheel torque command and the post-correction right wheel torque command is a request torque command.

As a result, operation of the left wheel driving device 31 and the right wheel driving device 32 is controlled in accordance with the torque commands obtained as described above, respectively, whereby total summation torque maintains the request torque and a torque difference corresponding to a differential control amount (left and right torque difference) is generated between the left wheel 41 and the right wheel 42.

A method for controlling driving of a vehicle based on roll motion characteristics was described above, and it is possible to use the control based on roll motion characteristics together with control based on yaw motion characteristics.

For example, because passengers are more sensitive to a roll angle and roll angular acceleration (a roll motion characteristic) rather than transverse acceleration in terms of riding comfort, the controller 20 may be set to perform roll damping control based on a roll motion characteristic in the comfort mode and perform handling responsiveness (transverse movement performance) enhancement control based on a yaw motion characteristic in the sports mode.

Hereafter, control based on a yaw motion characteristic is described.

When the current driving mode is the sports mode, the controller 20 determines a differential control amount so that a yaw moment enhancement effect is induced, and corrects a pre-correction left wheel torque command and a pre-correction right wheel torque command using the determined differential control amount so that a left and right torque difference corresponding to the differential control amount is generated between the left wheel 41 and the right wheel 42.

That is, torque is applied to the left wheel 41 and the right wheel 42 in accordance with final post-correction left wheel torque command and post-correction right wheel torque command so that a left and right torque difference corresponding to a differential control amount is generated between torque which is applied to the left wheel and torque which is applied to the right wheel. In the present case, the differential control amount which is used to correct torque commands may be the same value as the left and right torque difference.

In the control based on a yaw motion characteristic too, a differential control amount and a left and right torque difference are generated only when steering input by a driver operating a steering wheel is detected and a vehicle is turned rather than are always generated. That is, the driving control process based on the yaw motion characteristic that generates a left and right torque difference is not performed when a vehicle is straightly driven.

The controller 20 can determine a differential control amount as a value according to steering input information by a driver. The steering input information may be steering angle information which is obtained from a signal of a steering angle sensor of the driving information detector 12, and the steering angle information may be a steering angle or information obtained by additionally processing a steering angle.

In the present case, the controller 20 may be set to determine a differential control amount as a function of a steering angle and a derivative of the steering angle. The following Equation 8 is an example of a formula that can determine a differential control amount using a steering angle and a derivative of the steering angle.

$$\Delta T_{diff} = C_0 \delta + C_1 \dot{\delta} + C_2 \ddot{\delta} + C_3 \dddot{\delta} + \ldots \quad \text{[Equation 8]}$$

In Equation 8, $\Delta T_{diff}$ is a differential control amount, $\delta$ is a steering angle, and $C_0$, $C_1$, $C_2$, and $C_3$ are preset coefficients. According to Equation 8, the sum of values obtained by multiplying a steering angle and a derivative of the steering angle by the coefficients described above, as weights, is determined as a differential control amount.

The controller 20 may be set to calculate a differential control amount using a transfer function including a steering angle as input thereof, as shown in Equation 9.

$$\frac{\Delta T_{diff}}{\delta} = \frac{C_{N0} + C_{N1}s + C_{N2}s^2 + C_{N3}s^3 + \ldots}{C_{D0} + C_{D1}s + C_{D2}s^2 + C_{D3}s^3 + \ldots} \quad \text{[Equation 9]}$$

In Equation 9, $C_{N0}$, $C_{N1}$, $C_{N2}$, $C_{N3}$, $C_{D0}$, $C_{D1}$, $C_{D2}$, and $C_{D3}$ may be preset coefficients.

As described above, the controller 20 can determine a differential control amount using one of Equations 8 and 9, and the differential control amount may be considered as a value which is determined in connection with steering input information by a driver.

As in the examples of Equations 8 and 9, it is possible to determine a differential control amount using a transfer function between a steering angle and the differential control amount or it is possible to determine the sum of the values obtained by multiplying a steering angle and a derivative term of the steering angle by weights set in accordance with driving modes, respectively, as a differential control amount.

When a differential control amount in a yaw moment enhancement direction is defined as a control amount including a positive (+) value and a differential control amount in a yaw damping direction is defined as a control amount including a negative (−) value, the coefficients described above are set so that a differential control amount may be determined as a positive (+) value in the sports mode.

In control based on a yaw motion characteristic in the sports mode, when a differential control amount is determined, it is possible to correct an inside wheel torque command by subtracting ½ (a torque correction amount) of the differential control amount and correct an outside wheel torque command by adding ½ (a torque correction amount) of the differential control amount.

Figure 5:
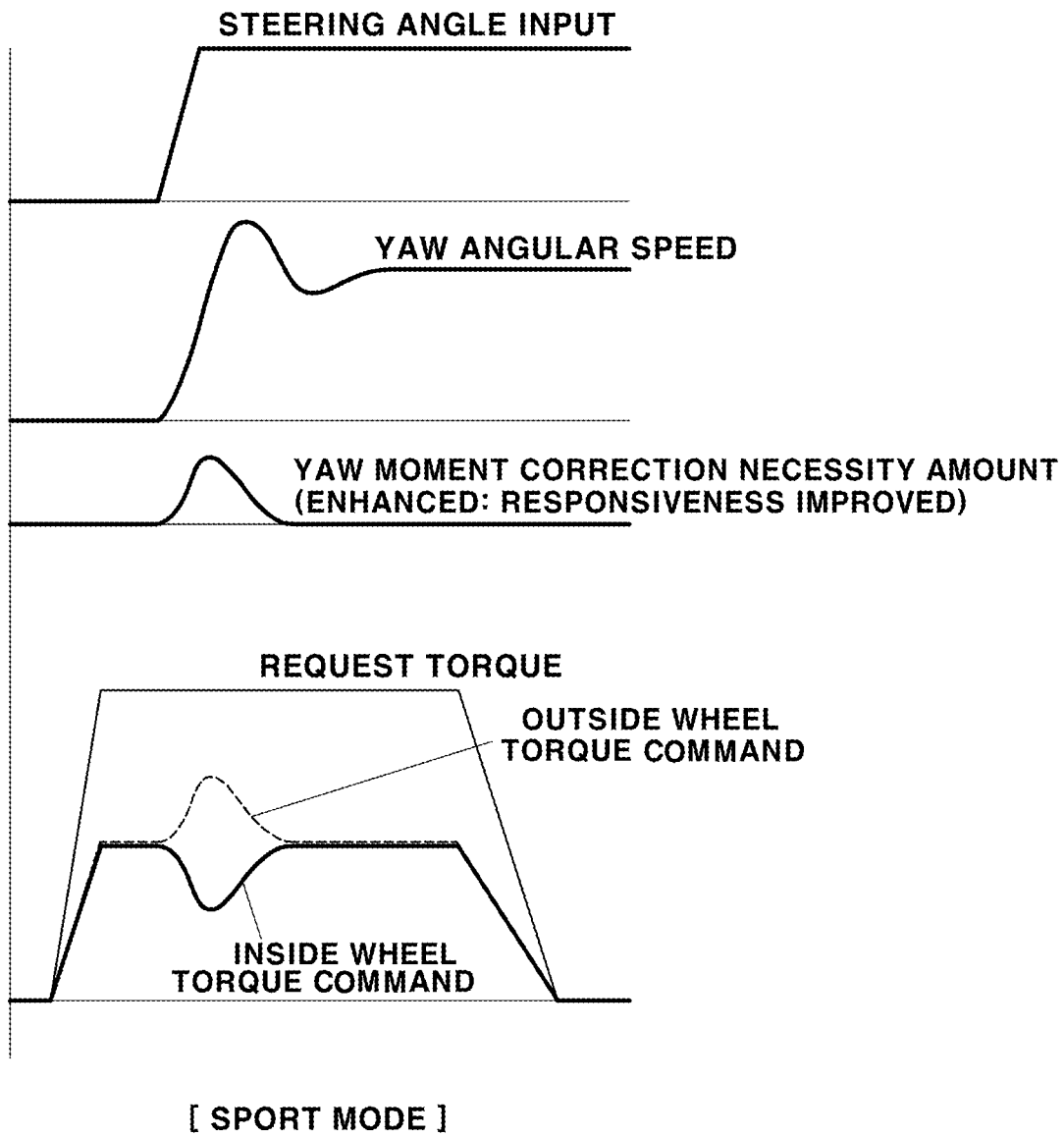
FIG. 5 is a view exemplifying a control state based on a yaw motion characteristic in an exemplary embodiment of the present disclosure of the present disclosure.

FIG. 5 is a view exemplifying a control state based on a yaw motion characteristic in an exemplary embodiment of the present disclosure of the present disclosure. The "yaw moment correction necessity amount" shown in FIG. 5 may be considered as a torque correction amount which is determined as ½ of a differential control amount.

As may be seen from FIG. 5, ½ of a differential control amount (left and right torque difference) which is subtracted or added for an inside wheel torque command and an outside wheel torque command is a torque correction amount, and it is possible to determine final torque commands by correcting an inside wheel torque command and an outside wheel torque command by the torque correction amount corresponding to a differential control amount.

As described above, ½ of a differential control amount may be applied to each of a left wheel torque command and a right wheel torque command, and in the present case, the sum of the post-correction left wheel torque command and the post-correction right wheel torque command is a request torque command.

As a result, in the control based on a yaw motion characteristic too, operation of the left wheel driving device 31 and the right wheel driving device 32 is controlled in accordance with the torque commands obtained as described above, respectively, whereby total summation torque maintains the request torque and a torque difference corresponding to a differential control amount (left and right torque difference) is generated between the left wheel 41 and the right wheel 42.

Accordingly, in the method for controlling driving of a vehicle according to an exemplary embodiment of the present disclosure, a request torque command is distributed into a left wheel torque command and a right wheel torque command, and the distributed torque commands are corrected by a differential control amount according to a driving mode of a vehicle and steering input information by a driver.

Furthermore, torque command follow control for controlling torque which is applied to wheels is performed based on the post-correction torque commands, whereby torque including a left and right difference by the differential control amount may be applied to the left wheel and the right wheel of a vehicle.

As a result, according to the method for controlling driving of a vehicle of the present disclosure, handling responsiveness (transverse movement performance) of a vehicle may be differentiated in accordance with vehicle driving modes and steering input information by a driver, and it is possible to provide definitely differentiated handling responsiveness in accordance with driving modes in the same vehicle without adding specific hardware or costs.

The method for controlling driving of the present disclosure not only solves the contradiction relationship existing between riding comfort and handling performance, but differentiates the characteristic of handling performance intended for driving modes, thereby being able to satisfy handling performance at a level that customers want in a wide range and to contribute to improving the commercial value of a vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:
1. A method for controlling driving of a vehicle, the method comprising:
   a driving control process based on a roll motion characteristic of the vehicle,
   wherein the driving control process based on the roll motion characteristic includes:
      determining, by a controller, a request torque command when the vehicle is turning and distributing the determined request torque command into a left wheel torque command and a right wheel torque command;
      determining, by the controller, a roll motion correction necessity amount according to steering input and a current vehicle driving mode when the vehicle is turned;
      determining, by the controller, a differential control amount for generating a difference applied torques between a left wheel and a right wheel of the vehicle based on the determined roll motion correction necessity amount;

correcting, by the controller, the distributed left wheel torque command and the distributed right wheel torque command using the determined differential control amount; and controlling, by the controller, the torque which is applied to the left wheel and the torque which is applied to the right wheel in accordance with the corrected left wheel torque command and the corrected right wheel torque command when the vehicle is turned, wherein, in the determining of the roll motion correction necessity amount, the roll motion correction necessity amount is determined using a transfer function including a steering angle which is steering input information as input thereof, the transfer function includes transfer functions provided for vehicle driving modes, respectively, and the transfer functions provided for the vehicle driving modes, respectively, have coefficients set as different values in accordance with the vehicle driving modes so that roll motion correction necessity amounts that are differentiated values are determined in accordance with the vehicle driving modes.

2. The method of claim 1, wherein the determining of the roll motion correction necessity amount includes:
determining roll motion information of the vehicle according to the steering input when the vehicle is turned; and
determining the roll motion correction necessity amount according to the current vehicle driving mode based on the determined roll motion information of the vehicle.

3. The method of claim 2, wherein the roll motion information of the vehicle includes at least one of a roll angle, a roll angular speed and a roll angular acceleration that are information obtained by processing the roll angle, and a derivative of the roll angle.

4. The method of claim 2, wherein, in the determining of the roll motion information of the vehicle, the roll motion information of the vehicle is measured by a sensor.

5. The method of claim 2, wherein, in the determining of the roll motion information of the vehicle, the roll motion information of the vehicle is determined using the transfer function including the steering angle, which is the steering input information, as the input thereof.

6. The method of claim 5, wherein, in the determining of the roll motion information of the vehicle, the roll motion information of the vehicle is finally determined as a sum of roll motion information determined from the steering angle using a steering angle-roll motion transfer function and roll motion information determined from a differential control amount of an immediately previous control period using a differential control amount-roll motion transfer function.

7. The method of claim 1, wherein, in the determining of the roll motion correction necessity amount, the current vehicle driving mode is one selected from a comfort mode, a normal mode, and a sports mode.

8. The method of claim 7,
wherein, when the current vehicle driving mode is the comfort mode, the roll motion correction necessity amount is set as a negative (−) value to provide a roll damping effect, and
wherein, when the current vehicle driving mode is the sports mode, the roll motion correction necessity amount is set as a value, which is greater than the negative (−) value in the comfort mode, or as a positive (+) value to provide a weak roll damping effect in comparison to the comfort mode or provide a roll moment enhancement effect.

9. The method of claim 1, wherein, in the determining of the differential control amount, the differential control amount is determined using a transfer function including the roll motion correction necessity amount as input thereof.

10. The method of claim 1, wherein, the distributed left wheel torque command and the distributed right wheel torque command are corrected by ½ of the differential control amount in the correcting of the distributed left wheel torque command and the distributed right wheel torque command so that a difference in the applied torques between the left wheel and the right wheel becomes the differential control amount in the controlling of the torque which is applied to the left wheel and the torque which is applied to the right wheel.

11. The method of claim 10, wherein, in the left wheel and the right wheel, an inside turning wheel torque command is corrected by subtracting ½ of the differential control amount therefrom and an outside turning wheel torque command is corrected by adding ½ of the differential control amount thereto.

12. The method of claim 1, further including a driving control process based on a yaw motion characteristic for yaw moment enhancement,
wherein the driving control process based on the yaw motion characteristic comprises:
determining the request torque command and distributing the determined request torque command into the left wheel torque command and the right wheel torque command by the controller when the vehicle is turned;
determining the differential control amount for generating the difference in the applied torques between the left wheel and the right wheel based on the determined steering input information when the vehicle is turned by the controller;
correcting the distributed left wheel torque command and the distributed right wheel torque command using the determined differential control amount by the controller; and
controlling the torque which is applied to the left wheel and the torque which is applied to the right wheel in accordance with the corrected left wheel torque command and the corrected right wheel torque command by the controller when the vehicle is turned, and
wherein one of the driving control process based on the roll motion characteristic and the driving control process based on the yaw motion characteristic is selected and performed in accordance with the current vehicle driving mode.

13. The method of claim 12,
wherein the driving control process based on the roll motion characteristic is performed when the current vehicle driving mode is a comfort mode, and
wherein the driving control process based on the yaw motion characteristic is performed when the current vehicle driving mode is a sports mode.

14. The method of claim 12, wherein, in the determining of the differential control amount of the driving control process based on the yaw motion characteristic, the differential control amount is determined as a function of the steering angle and a derivative of the steering angle that are the steering input information.

15. The method of claim 12, wherein, in the determining of the differential control amount of the driving control process based on the yaw motion characteristic, the differential control amount is determined using the transfer function including the steering angle, which is the steering input information, as the input thereof.

16. The method of claim 12, wherein, in the driving control process based on the yaw motion characteristic,
the distributed left wheel torque command and the distributed right wheel torque command are corrected by ½ of the differential control amount in the correcting of the distributed left wheel torque command and the distributed right wheel torque command so that a difference in the applied torques between the left wheel and the right wheel becomes the differential control amount in the controlling of the torque which is applied to the left wheel and the torque which is applied to the right wheel.

17. The method of claim 12, wherein, in the driving control process based on the yaw motion characteristic,
the differential control amount is determined as a positive (+) value in the determining of the differential control amount, and
in the correcting of the distributed left wheel torque command and the distributed right wheel torque command, correction of subtracting ½ of the determined differential control amount is performed on an inside turning wheel torque command of the distributed left wheel torque command and the distributed right wheel torque command, and correction of adding ½ of the determined differential control amount is performed on an outside turning wheel torque command.

18. A method for controlling driving of a vehicle, the method comprising:
a driving control process based on a roll motion characteristic of the vehicle,
wherein the driving control process based on the roll motion characteristic includes:
determining, by a controller, a request torque command when the vehicle is turning and distributing the determined request torque command into a left wheel torque command and a right wheel torque command;
determining, by the controller, a roll motion correction necessity amount according to steering input and a current vehicle driving mode when the vehicle is turned;
determining, by the controller, a differential control amount for generating a difference applied torques between a left wheel and a right wheel of the vehicle based on the determined roll motion correction necessity amount;
correcting, by the controller, the distributed left wheel torque command and the distributed right wheel torque command using the determined differential control amount; and
controlling, by the controller, the torque which is applied to the left wheel and the torque which is applied to the right wheel in accordance with the corrected left wheel torque command and the corrected right wheel torque command when the vehicle is turned,
wherein the determining of the roll motion correction necessity amount includes:
determining roll motion information of the vehicle according to the steering input when the vehicle is turned; and
determining the roll motion correction necessity amount according to the current vehicle driving mode based on the determined roll motion information of the vehicle, and
wherein, in the determining of the roll motion correction necessity amount, the roll motion correction necessity amount is determined as a sum of values obtained by multiplying a roll angle and a derivative term of the roll angle, which are the roll motion information, by weights set in accordance with vehicle driving modes, respectively.

19. A method for controlling driving of a vehicle, the method comprising:
a driving control process based on a roll motion characteristic of the vehicle,
wherein the driving control process based on the roll motion characteristic includes:
determining, by a controller, a request torque command when the vehicle is turning and distributing the determined request torque command into a left wheel torque command and a right wheel torque command;
determining, by the controller, a roll motion correction necessity amount according to steering input and a current vehicle driving mode when the vehicle is turned;
determining, by the controller, a differential control amount for generating a difference applied torques between a left wheel and a right wheel of the vehicle based on the determined roll motion correction necessity amount;
correcting, by the controller, the distributed left wheel torque command and the distributed right wheel torque command using the determined differential control amount; and
controlling, by the controller, the torque which is applied to the left wheel and the torque which is applied to the right wheel in accordance with the corrected left wheel torque command and the corrected right wheel torque command when the vehicle is turned,
wherein the determining of the roll motion correction necessity amount includes:
determining roll motion information of the vehicle according to the steering input when the vehicle is turned; and
determining the roll motion correction necessity amount according to the current vehicle driving mode based on the determined roll motion information of the vehicle, and
wherein, in the determining of the roll motion correction necessity amount, the roll motion correction necessity amount is determined using a transfer function including the roll motion information as input thereof,
the transfer function includes transfer functions provided for vehicle driving modes, respectively, and
the transfer functions provided for the vehicle driving modes, respectively, have coefficients set as different values in accordance with the vehicle driving modes so that roll motion correction necessity amounts that are differentiated values are determined in accordance with the vehicle driving modes.

* * * * *